Patented Oct. 25, 1949

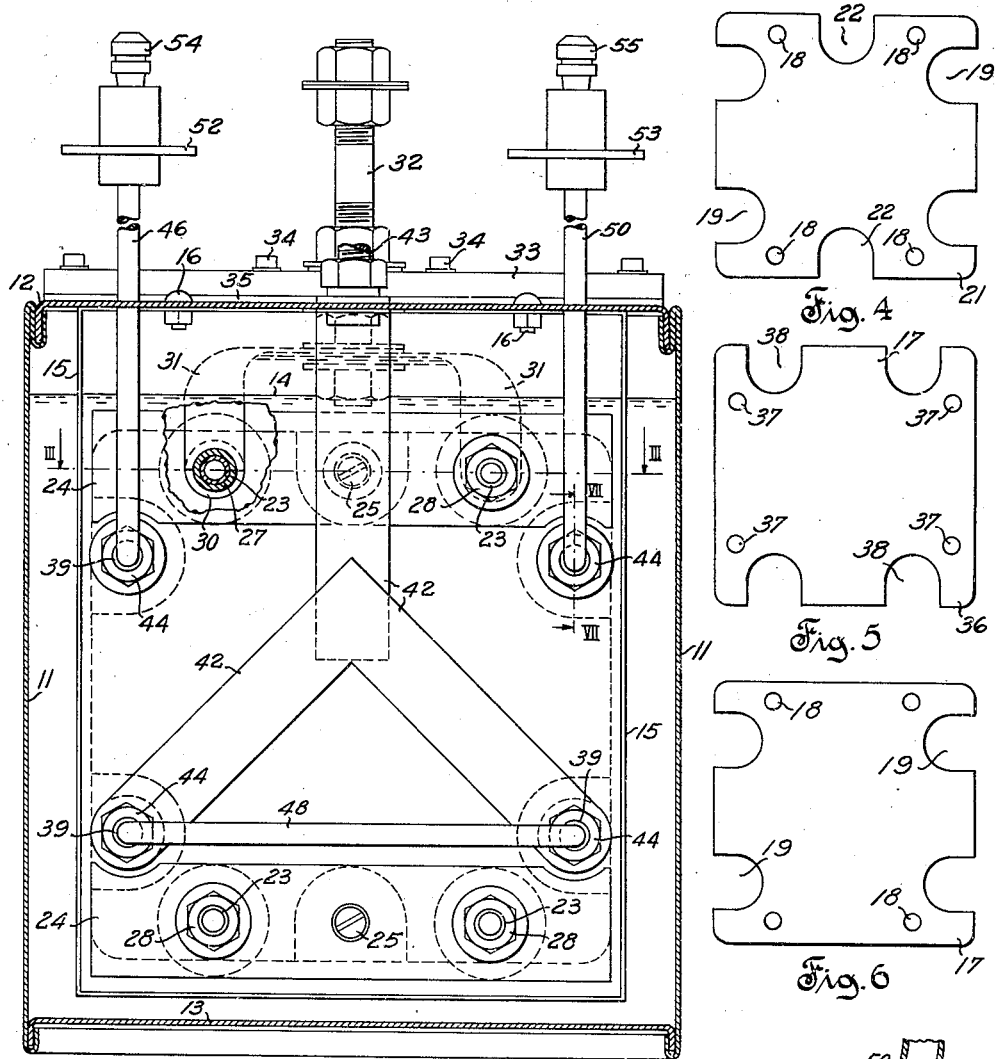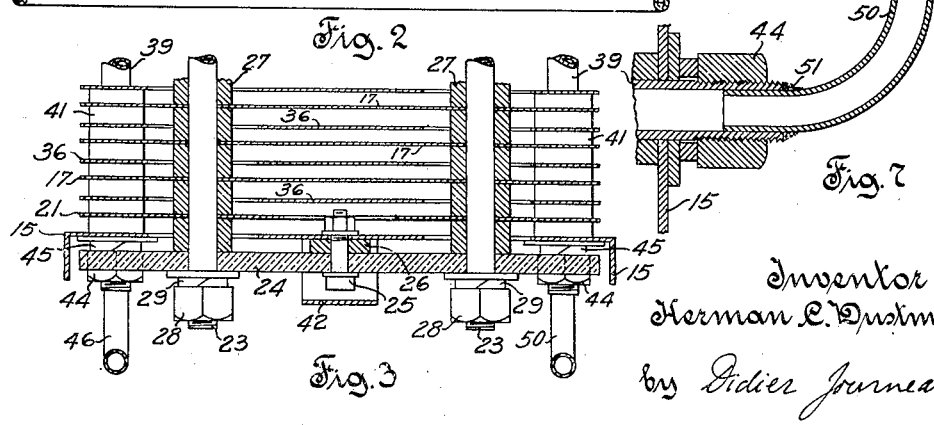

2,486,131

UNITED STATES PATENT OFFICE 2,486,131

CAPACITOR WITH GROUNDED PLATES MOUNTED ON COOLING PIPES

Herman C. Dustman, West Allis, Wis., assignor to Allis-Chalmers Manufacturing Company, Milwaukee, Wis., a corporation of Delaware Application December 21, 1945, Serial No. 636,462

1 Claim. (Cl. 175—41)

This invention relates in general to capacitors, and more particularly to means for cooling a capacitor comprising rigid plates immersed in a solid or liquid dielectric.

When an alternating voltage is impressed on the electrodes or plates of a capacitor of the solid or liquid dielectric type, a certain amount of energy is dissipated in the form of heat in the dielectric separating the plates. The heat so evolved must be removed from the capacitor to prevent overheating of the dielectric. As it is not feasible to insert cooling devices between the plates, the heat must be transmitted through the dielectric to the wall of the capacitor casing or to a cooling device disposed within the casing. The temperature of the dielectric is then nonuniform and the continuous rating of the capacitor is restricted by the necessity of limiting the temperature of the dielectric at its hottest spot.

The above mentioned disadvantage may be avoided by utilizing the plates themselves or parts thereof as heat collecting elements. When the plates are rigid, the plates of one polarity may be mounted on at least one metallic pipe in thermally conductive relation therewith, and heat may be abstracted therefrom by causing a flow of cooling fluid through the pipe. When feasible, it is convenient to conductively connect the set of plates so provided with the casing, so as to avoid the necessity of insulating the elements of the cooling system from the casing. To reduce the cost and bulk of the capacitor to a minimum it is advantageous to utilize plates having a generally square outline and having substantially all the same configuration, the plates of one polarity being rotated by ninety degrees with respect to the plates of the other polarity to permit mounting the two sets of plates on their respective supports.

It is therefore an object of the present invention to provide a capacitor of the rigid plate type in which heat evolved in a solid or liquid dielectric is removed therefrom through at least one of the sets of plates of the capacitor.

Another object of the present invention is to provide a capacitor of the rigid plate type in which an element serves both as a support for a set of plates and as cooling element for the capacitor.

Another object of the present invention is to provide a capacitor of the rigid plate type in which both sets of plates consist substantially entirely of elements having a square outline and a uniform configuration.

Objects and advantages other than those above set forth will be apparent from a consideration of the following description when read in connection with the accompanying drawing, in which, Fig. 1 is a view in longitudinal cross-section through one embodiment of the present invention having a set of grounded plates and a set of plates to be placed under potential;

Fig. 2 is a view in transverse cross-section taken along line II—II in Fig. 1, a portion of the capacitor elements being assumed removed to show one of the connections for the set of plates under potential;

Fig. 3 is a partial view in horizontal cross-section taken along line III—III in Fig. 2;

Fig. 4 is a view in elevation of one of the end plates of the set under potential;

Fig. 5 is a view in elevation of one of the grounded plates;

Fig. 6 is a view in elevation of one of the intermediate plates of the set under potential; and Fig. 7 is an enlarged partial view in longitudinal cross-section taken along line VII—VII in Fig. 2.

Figure 1:
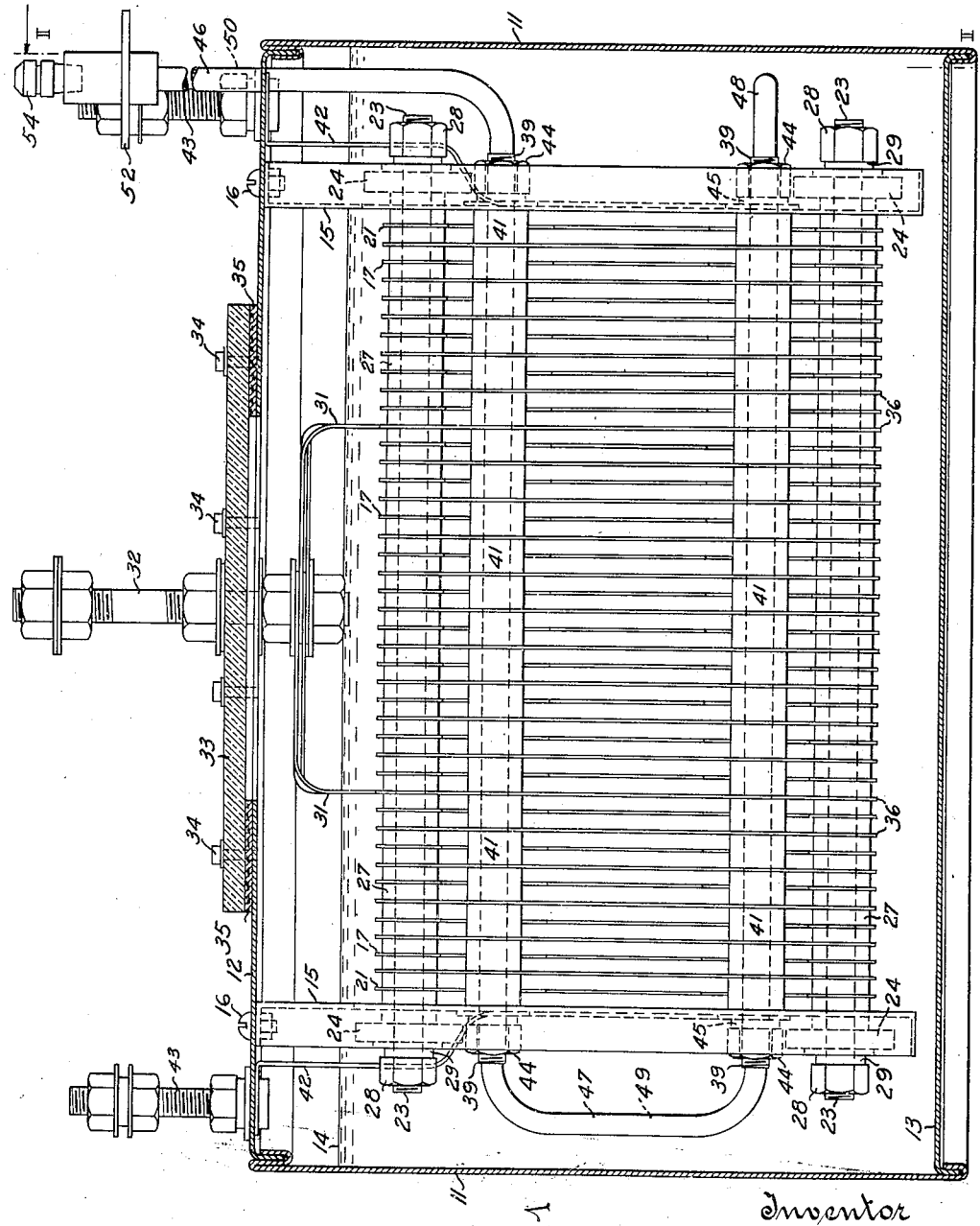

Referring more particularly to the drawing by characters of reference, numeral 11 designates the side walls of a parallelepipedic casing, which are preferably made from a single sheet of a suitable metal, such as copper. The top and bottom edges of walls 11 are preferably bent to form gutters for receiving the flanged edges of a brass cover 12 and of a copper bottom plate 13, respectively. The bottom plate is soldered to the side walls to complete the casing, and the cover is preferably also soldered to the side walls after assembly of the entire capacitor. The casing is substantially filled with a suitable dielectric material 14 such as mineral oil.

The plates of the capacitor are suspended from cover 12 through a pair of hangers 15. Each hanger consists of a brass plate having its edges bent at ninety degrees to form flanges and is fastened to cover 12 by means of brass bolts 16. The plates to be placed under potential comprise a plurality of parallel intermediate plates 17 of suitable rigid sheet metal such as aluminum. Plates 17 are of generally square outline provided with a plurality of circular apertures 18 for mounting the plates on common rod-like supports. The edges of plates 17 are provided with a plurality of indentations 19 of substantially larger size than apertures 18 for providing space for the supports carrying the grounded set of plates. Plates 17 are assembled between two end plates 21 identical to plates 17 except for additional indentations 22 for providing space for mounting elements associated with the plates.

Plates 17, 21 are disposed vertically and rest on one or more horizontal copper pipes 23 extending through apertures 18 thereof. Pipes 23 penetrate hangers 15 through apertures thereof giving substantial clearance about the pipes and are supported on the hangers through strips 24 of any suitable insulating material such as "mycalex." Strips 24 are fastened to hangers 15 by means of brass bolts 25. Brass washers 26 are inserted between strips 24 and hangers 15 for increasing the creeping distance between pipes 23 and hangers 15 over the surface of strips 24.

Brass bushings 27 surrounding pipes 23 are interleaved between plates 17, 21 for determining their spacing. A plurality of nuts 28 associated with the usual spring washers 29 are screwed on pipes 23 for pressing plates 17, 21 and bushings 27 securely together in electrically conductive relation regardless of temperature variations of the capacitor.

Four of bushings 27 are each provided with an annular slot 30 wherein the suitably shaped end of a copper strap 31 is inserted and brazed to form a terminal connection. Straps 31 are jointly fastened to a terminal bolt 32 extending through an aperture of cover 12 and mounted on a plate 33 of any suitable insulating material such as "mycalex." Plate 33 is fastened on cover 12 by means of screws 34 and is sealed thereagainst by means of a gasket 35.

The grounded plates 36 are identical to plates 17 and are likewise provided with apertures 37 and with indentations 38 and are interleaved between plates 17 but are rotated by ninety degrees with respect thereto. Plates 36 are insulated from the adjacent plates 17 by the dielectric confined therebetween, which may be supplemented by plates of solid insulating material. Plates 36 are supported on one or more horizontal copper pipes 39 extending through apertures 37 and rest on the pipes in thermally conductive relation therewith through the edges of such apertures. Pipes 39 penetrate with small clearance through apertures of hangers 15 and rest directly on the edges of such apertures.

Brass bushings 41 surrounding pipes 39 and resting thereon in thermally conductive relation therewith are interleaved between plates 36 for determining the spacing of each plate 36 with respect to the adjacent plates 36 and also with respect to the plates 17 interleaved therebetween. The outside diameter of bushings 41 is so chosen that the bushings are in the required spaced relation with respect to the edges of indentations 19 of plates 17, and bushings 27 likewise are in the desired spaced relation with respect to the edges of indentations 38 of plates 36.

The lower pair of pipes 39 is associated with a pair of bifurcated copper terminal straps 42 for conducting current to plates 36 from a pair of copper terminal bolts 43 mounted on cover 12. The lower ends of straps 42 are drilled and encompass the associated pipes 39. A plurality of nuts 44 with associated spring washers 45 are screwed on pipes 39 for pressing together hangers 15, plates 36, bushings 41 and, in the case of the lower pipes, straps 42 in thermally and electrically conductive relation. Current is thus conducted between terminals 43 and plates 36 independently of bolts 16, which support the weight of the entire plate assembly and therefore cannot be depended on to provide a low resistance connection between cover 12 and hangers 15.

For cooling the capacitor the different pipes 39 are connected hydraulically in series with each other and with a suitable source of water or other cooling fluid under pressure (not shown) through a plurality of copper pipe sections 46 to 50. Each pipe section comprises a rectilinear portion and at least one elbowed portion ending in alinement with the cooperating pipe 39. As shown in Fig. 7, each pipe section is inserted within the end of the cooperating pipe 39, preferably with a tight fit, and a body of silver solder 51 or other fusible metal is provided for uniting the cooperating pipe ends in pressure tight relation. Pipe sections 46 and 50 extend through cover 12 and are soldered thereto. Pipe sections 46 and 50 may be provided with drilled flanges 52, 53 for fastening them to a framework, and may also be provided with compression type fittings 54, 55 for connecting them to the source of cooling fluid and to a drain.

It will be apparent that the herein described capacitor is a simple construction and involves a minimum number of different parts. In particular, the parallelepipedic form of the casing permits its easy fabrication and causes the capacitor to occupy a minimum of space. The plates may all be made from sheet metal by means of a single die, subject only to the further provision of indentations 22 in the two plates 21. The plates are held in good thermally and electrically conductive connection with the other plates and with the intervening bushings by means of the nuts and spring washers provided therefor.

In operation, heat is evolved mainly in the portion of dielectric 14 confined between plates 17, 21 and plates 36. The heat is easily transmitted to plates 36 and bushings 41 by conduction and convection. Plates 36 and bushings 41, being of substantial thickness and in direct contact with pipes 39, transmit the heat thereto by conduction without substantial temperature drop. The fluid flowing through pipes 39 removes the heat from the pipes whereby the hot spot temperature of dielectric 14 may be maintained within a few degrees of the temperature of the fluid supplied to pipes 39.

Although but one embodiment of the present invention has been illustrated and described, it will be apparent to one skilled in the art that various changes and modifications may be made therein without departing from the spirit of the invention or from the scope of the appended claim.

It is claimed and desired to secure by Letters Patent:

A capacitor comprising a casing, a dielectric in said casing, a plurality of suspension hangers, a plurality of bodies of insulating material, means for mounting said insulating bodies on said hangers, a plurality of substantially square metallic plates all provided with a plurality of circular apertures and of indentations of substantially larger size than said apertures and divided into a first plurality of said plates immersed in said dielectric and a second plurality of said plates interleaved with said first plurality of plates, the end plates of said first plurality of plates being provided with additional oppositely disposed marginal indentations to provide clearance for the said mounting means, means for supporting said first plates on said insulating bodies comprising a first plurality of supporting pipes extending through the said apertures of said first plates and through the indentations of said second plates, a first plurality of metallic bushings surrounding said first supporting pipes and interleaved between said first plates in spaced relation to the edges of said second plates, and means for pressing and maintaining said first plates, said first bushings and said first supporting pipes together in substantially constant electrically conductive relation regardless of dimensional changes of said first supporting pipes caused by temperature variations of said first supporting pipes including a first plurality of nuts and spring washers on said first supporting pipes, means for supporting said second plates on said hangers comprising a second plurality of supporting pipes extending through the said apertures of said second plates and through the said indentations of said first plates, a second plurality of metallic bushings surrounding said second supporting pipes and interleaved between said second plates in spaced relation to the edges of said first plates, and means for pressing and maintaining said second plates, said second bushings and said second supporting pipes together in substantially constant thermally and electrically conductive relation regardless of dimensional changes of said second supporting pipes caused by temperature variations of said second supporting pipes including a second plurality of nuts and spring washers on said second supporting pipes, and means for cooling said dielectric comprising a source of cooling fluid, a pipe section extending through said casing for connecting one of said second supporting pipes with said source, another pipe section extending through said casing to serve as an outlet for another of said second supporting pipes, and at least one pipe section interconnecting said second supporting pipes for causing a flow of cooling fluid from said source through the different said second supporting pipes, said pipe sections being immersed in said dielectric to cooperate with said second plates and said second supporting pipes in transmitting heat from said dielectric to said cooling fluid.

HERMAN C. DUSTMAN.

REFERENCES CITED

The following references are of record in the file of this patent:

UNITED STATES PATENTS

| Number | Name | Date |
|---|---|---|
| 1,955,776 | Smith | Apr. 24, 1934 |
| 2,079,921 | Osnos | May 11, 1937 |
| 2,151,787 | Marbury | Mar. 28, 1939 |

FOREIGN PATENTS

| Number | Country | Date |
|---|---|---|
| 395,420 | Great Britain | July 20, 1933 |